(12) United States Patent
Hao et al.

(10) Patent No.: US 11,755,055 B2
(45) Date of Patent: Sep. 12, 2023

(54) CONTROLLER ASSEMBLY AND ELECTRONIC DEVICE WITH THE SAME

(71) Applicants: HONGFUJIN PRECISION ELECTRONS (YANTAI) CO., LTD., Yantai (CN); HON HAI PRECISION INDUSTRY CO., LTD., New Taipei (TW)

(72) Inventors: Yu-Hsiang Hao, New Taipei (TW); Chien-Heng Chen, New Taipei (TW); Yao-Che Peng, New Taipei (TW)

(73) Assignees: HONGFUJIN PRECISION ELECTRONS (YANTAI) CO., LTD., Yantai; HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/895,483

(22) Filed: Aug. 25, 2022

(65) Prior Publication Data

US 2023/0068402 A1    Mar. 2, 2023

(30) Foreign Application Priority Data

Aug. 31, 2021  (CN) .......................... 202111011931.8

(51) Int. Cl.
G05G 5/03       (2008.04)
G05G 1/02       (2006.01)
A63F 13/24      (2014.01)

(52) U.S. Cl.
CPC .............. *G05G 5/03* (2013.01); *A63F 13/24* (2014.09); *G05G 1/02* (2013.01); *A63F 2300/1043* (2013.01); *G05G 2505/00* (2013.01)

(58) Field of Classification Search
None
See application file for complete search history.

(56) References Cited

FOREIGN PATENT DOCUMENTS

| CN | 109744897 A |   | 5/2019 |            |
|----|-------------|---|--------|------------|
| CN | 109779439 A | * | 5/2019 | ............... B60J 5/06 |
| CN | 110709145 A | * | 1/2020 | ............. A63F 13/24 |

* cited by examiner

*Primary Examiner* — Vicky A Johnson
(74) *Attorney, Agent, or Firm* — ScienBiziP, P.C.

(57) ABSTRACT

A controller assembly functioning as a joystick includes a driving unit, a sliding member, a potentiometer, and a controlling module. The driving unit includes a driving mechanism, a worm, and a worm wheel, the worm wheel connected to the sliding member. Through the worm, the driving mechanism rotates the worm wheel, causing the sliding member to move up and down only. The potentiometer detects rotation of the worm wheel, the controlling module obtains movement accordingly of the sliding member. The controlling module obtains a user's operating force applied to the driving mechanism, and compares the positional information and the operating force information with preset values to obtain comparison results. The sliding member is driven to move according to the two comparison results. An electronic device with the controller assembly is also disclosed.

19 Claims, 6 Drawing Sheets

CONTROLLER ASSEMBLY AND ELECTRONIC DEVICE WITH THE SAME

FIELD

The subject matter herein generally relates to human-machine interfaces, and more particularly to a controller assembly and an electronic device with the controller assembly.

BACKGROUND

Game players are used in people's daily life. A user can control the game player through a joystick. An accuracy of controlling the joystick impacts the game experience. How to improve the accuracy of controlling the joystick has become an important issue.

BRIEF DESCRIPTION OF THE DRAWINGS

Implementations of the present disclosure will now be described, by way of embodiments, with reference to the attached figures.

DETAILED DESCRIPTION

Figure 1:
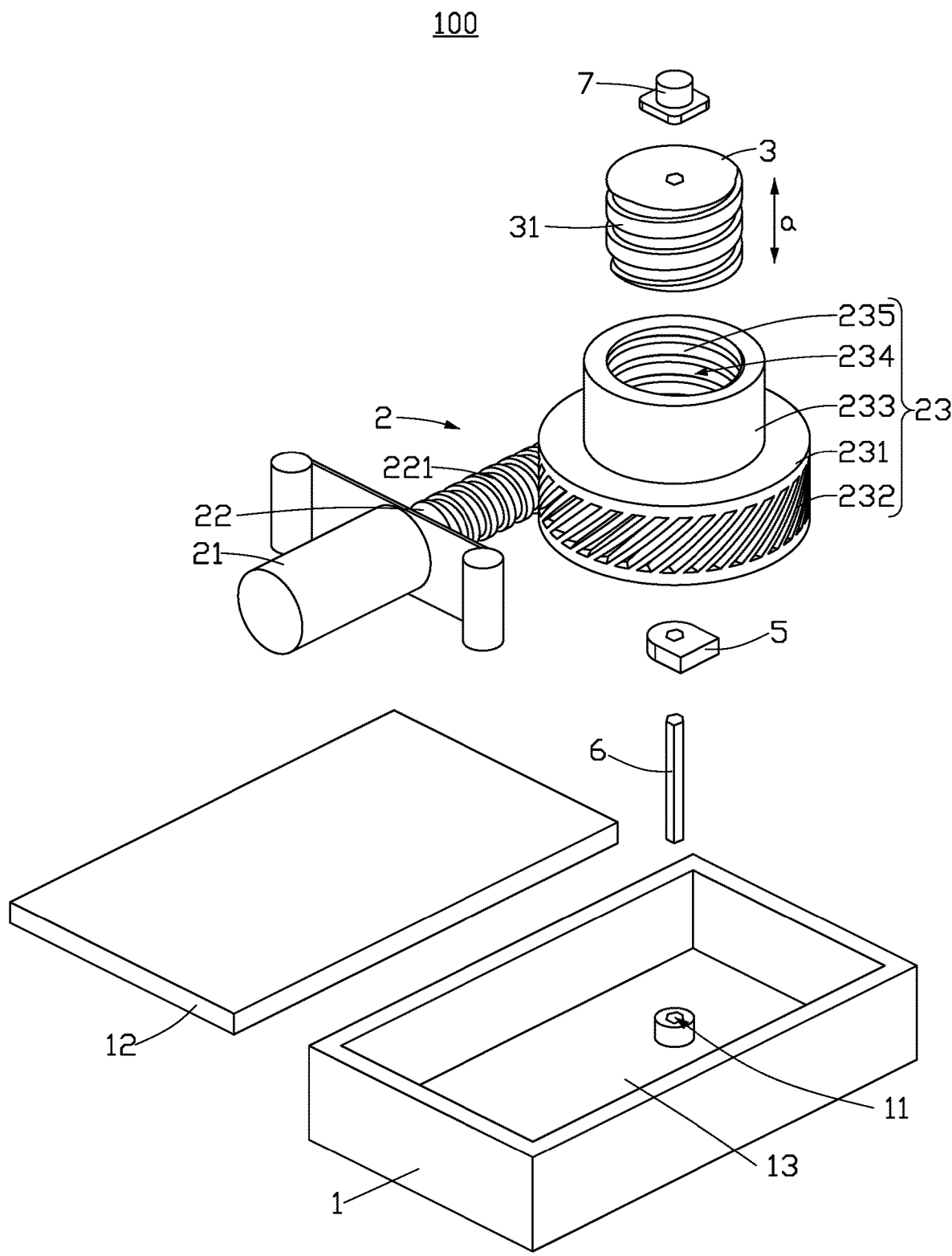
FIG. 1 is an exploded diagrammatic view of an embodiment of a controller assembly according to the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIGS. 1 to 5 illustrate a controller assembly 100 in one embodiment. The controller assembly 100 may be used in, but not limited to, a game player. The controller assembly 100 includes a driving unit 2, a sliding member 3, a potentiometer 5, and a controlling module 4.

The driving unit 2 includes a driving mechanism 21, a worm 22 disposed on an output end of the driving mechanism 21, and a worm wheel 23 engaged with and connected to the worm 22. The sliding member 3 is slidably received in the worm wheel 23. The potentiometer 5 is received in and connected to a side of the worm wheel 23 away from the sliding member 3. The controlling module 4 is electrically connected to the potentiometer 5 and the driving mechanism 21. The driving mechanism 21 is used to drive the worm wheel 23 to rotate, causing the sliding member 3 to move back and forth along a first direction "a", and the first direction "a" is along a central axis of the worm wheel 23. The potentiometer 5 is used to detect a rotation information (such as a rotation angle) of the worm wheel 23. The controlling module 4 is used to obtain positional information of the sliding member 3 according to the detected rotation information. The positional information indicates a moving distance of the sliding member 3 along the first direction "a". The controlling module 4 is also used to obtain an operating force information delivered to the driving mechanism 21. The operating force is the value of a force applied to the sliding member 3 by a user. The controlling module 4 compares the positional information with a preset positional value and compares the operating force information with a preset operating force value to obtain two comparison results. Then, the controlling module 4 controls the driving mechanism 21 to drive the worm wheel 23 to rotate according to the two comparison results, thereby driving the sliding member 3 to move back and forth along the first direction "a".

Figure 5:
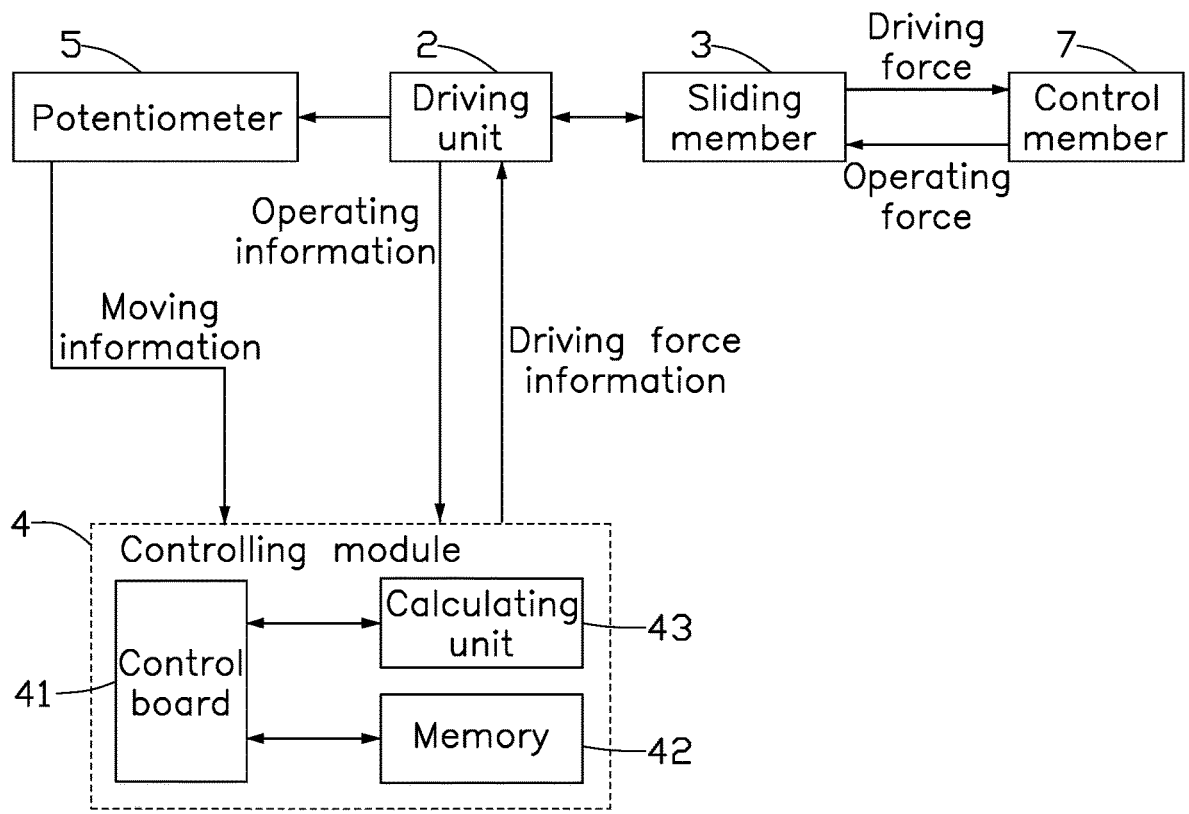
FIG. 5 is a block diagram of the controller assembly of FIG. 1.

Referring to FIGS. 1 and 5, in use, when the controller assembly 100 is used in a computer game, the control module 4 pre-stores the preset positional value and the preset operating force value. The preset positional value and the preset operating force value are set by manufacturer to give the user improved experience when controlling the controller assembly 100. Each time the user operates (e.g., presses) the sliding member 3, an operating force is applied to the sliding member 3 to drive the sliding member 3 to move downwards in the worm wheel 23. Then, the worm wheel 23 is driven to rotate to deliver the operating force to the driving mechanism 21. The potentiometer 5 detects the rotation information (such as the rotation angle) of the worm wheel 23. The controlling module 4 obtains the positional information of the sliding member 3 according to the detected rotation information and compares the positional information with the preset positional value to obtain a difference value as a comparison result. The controlling module 4 detects the operating force information delivered to the driving mechanism 21 and compares the operating force information with the preset operating force value to obtain a driving force information as another comparison result. Then, the controlling module 4 controls the driving mechanism 21 to output a driving force to drive the worm 22 and worm wheel 23 to rotate accordingly. For example, the worm wheel 23 rotates clockwise. When the operating force is more than the preset operating force, the controlling module 4 controls the driving mechanism 21 to drive the worm wheel 23 to rotate counterclockwise. Otherwise, when the operating force is less than the preset operating force, the controlling module 4 controls the driving mechanism 21 to drive the worm wheel 23 to rotate further clockwise. Then, the sliding member 3 is driven to move along the first direction "a" to adjust the position of the sliding member 3 to improve the accuracy of the operation of the user, so as to realize an adaptive process of the controller assembly 100 and improve the user's operation experience.

Referring to FIG. 1, the controller assembly 100 further includes a housing 1, which is used to receive the driving unit 2, the sliding member 3, and the potentiometer 5. In an embodiment, the housing 1 is substantially a cubic box. In other embodiments, the shape of the housing 1 may be changed.

In an embodiment, the housing 1 may be made of, but is not limited to, plastic.

Figure 2:
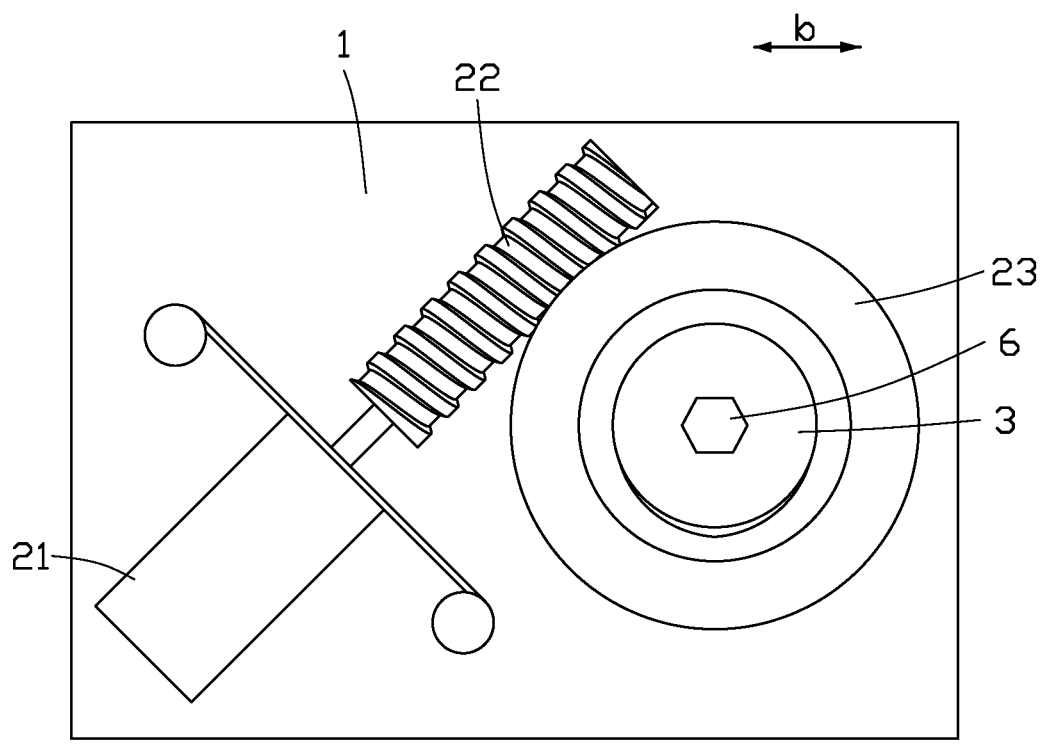
FIG. 2 is a top diagrammatic view of the controller assembly of FIG. 1, when a cover plate and a control member of the controller assembly are removed.
Figure 3:
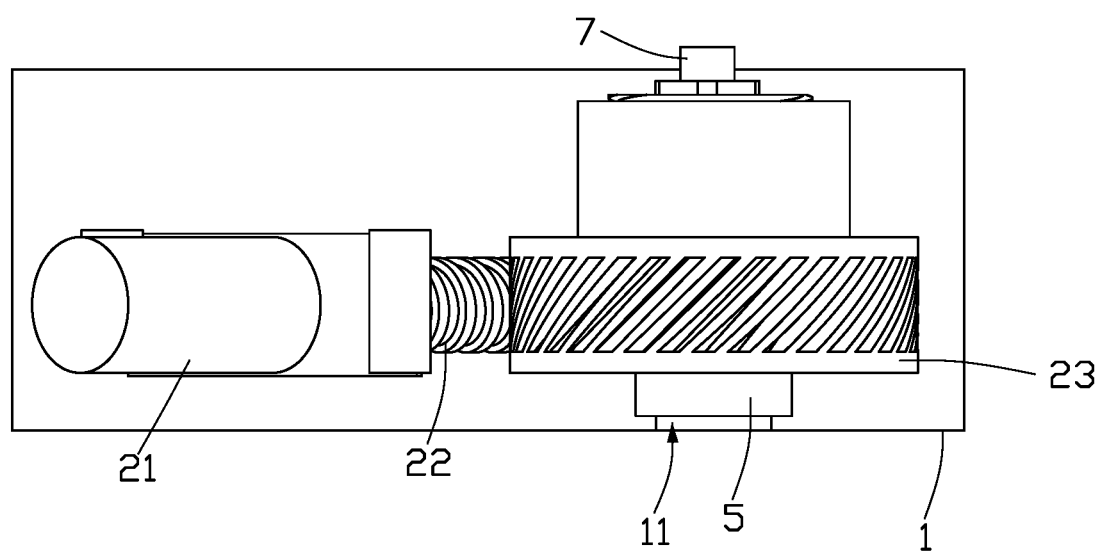
FIG. 3 is a side diagrammatic view of the controller assembly of FIG. 1.

Referring to FIGS. 1 to 3, an extension direction of the worm 22 is perpendicular to the central axis of the worm wheel 23 (i.e., the first direction "a"). A middle position of the worm 22 is engaged with an outer surface of the worm wheel 23. The driving mechanism 21 is connected so as to rotate the worm 22.

In an embodiment, a structure of the worm 22 is substantially cylindrical. An outer surface of the worm 22 defines a plurality of first external threads 221.

In an embodiment, the worm 22 may be made of, but not limited to, metal or plastic.

Referring to FIGS. 1 to 3, the worm wheel 23 includes a worm wheel body 231 and a fixing portion 233 disposed on the worm wheel body 231. An outer surface of the worm wheel body 231 defines a plurality of second external threads 232. The first external threads 221 of the worm 22 are engaged with the second external threads 232. The fixing portion 233 defines a fixing groove 234. The sliding member 3 is received in the fixing groove 234 and is coaxial with the worm wheel 23. When the driving mechanism 21 drives the worm 22 to rotate, the worm wheel body 231 and the fixing portion 233 are driven to rotate, thereby driving the sliding member 3 back and forth along the first direction "a".

In an embodiment, an inner surface of the fixing portion 233 defines a plurality of internal threads 235, and an outer surface of the sliding member 3 defines a plurality of third external threads 31 engaged with the internal threads 235. The sliding member 3 is connected to the worm wheel 23 through the third external threads 31 and the internal threads 235.

In an embodiment, the worm wheel 23 may be made of, but is not limited to, metal or plastic.

In an embodiment, the driving mechanism 21 may be, but is not limited to, a driving motor.

Referring to FIG. 1, the controller assembly 100 further includes a limit member 6. The limit member 6 penetrates the potentiometer 5, the worm wheel 23, and the sliding member 3 along the first direction "a". The non-rotatable limit member 6 is used to ensure that the sliding member 3 can only move back and forth along the first direction "a", rotation of the sliding member 3 itself is prevented. In addition, the limit member 6 is also used to fix the potentiometer 5 and the worm wheel 23 radially to avoid slack and undesired movements of the potentiometer 5 and the worm wheel 23 during a driving process.

In an embodiment, the housing 1 includes a bottom plate 13. The bottom plate 13 defines a limit groove 11. An end of the limit member 6 away from the sliding member 3 is fixed in the limit groove 11.

In an embodiment, along a second direction "b" perpendicular to the first direction "a", a cross-section of the limit member 6 is substantially triangular or polygonal. A hole is defined in each of the sliding member 3, the potentiometer 5, and the worm wheel 23, and the limit member 6 penetrates through the three holes. The cross-sectional shape of the limit member 6 is matched by the cross-sections of the three holes. In other embodiments, the cross-sectional shape of the limit member 6 can also be changed.

Figure 4:
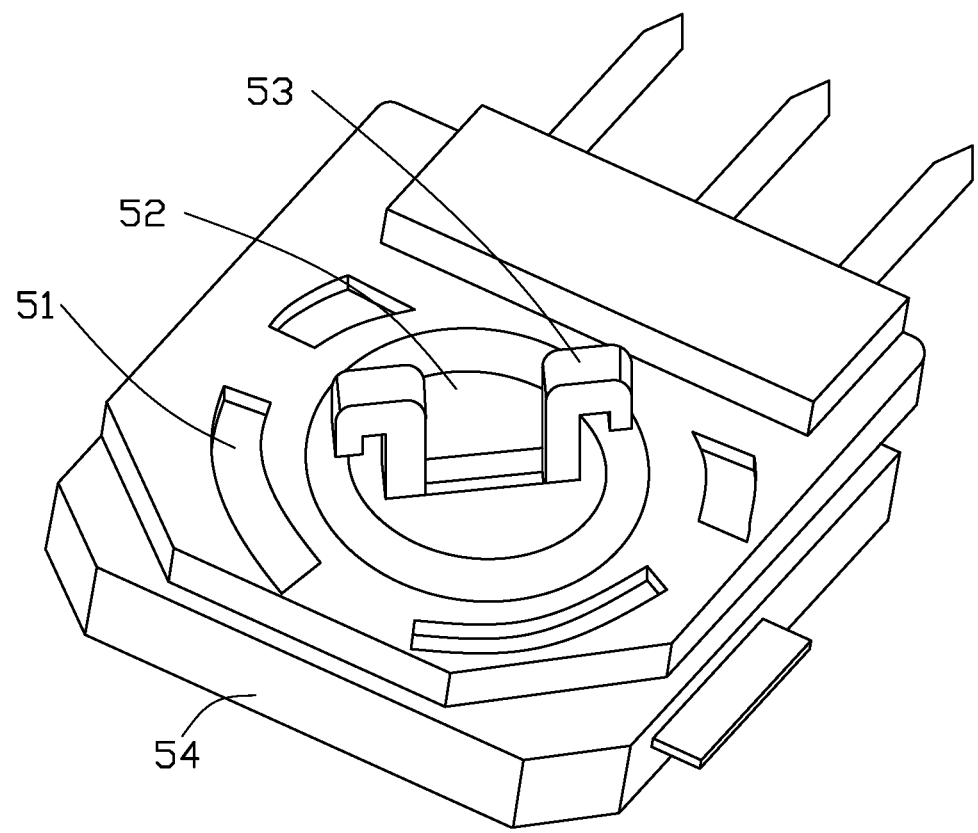
FIG. 4 is a diagrammatic view of an embodiment of a potentiometer of the controller assembly of FIG. 1.

Referring to FIG. 4, in an embodiment, the potentiometer 5 includes a potentiometer plate 54, a resistor 51 disposed on the potentiometer plate 54, a rotating unit 52 penetrating through the resistor 51, and at least one hook 53 disposed on the rotating unit 52. The resistor 51 is used to change a resistance as a conductive brush/pin moves around a circle. The rotating unit 52 is connected to the worm wheel 23 through the at least one hook 53. The resistor 51 includes multiple fixing pins (not shown) and a moving pin (not shown). The moving pin can be driven by the worm wheel 23 to rotate around the first direction "a" with respect to the fixing pins. Then, a resistance changes as the position of the moving pin is changed during the rotation. In this way, a voltage is obtained between the moving pin and each fixing pin. The voltage has a certain relationship with the position of the moving pin. Through the voltage, the rotation information of the worm wheel 23 can be obtained, and then the position information of the sliding member 3 located on the worm wheel 23 can also be obtained.

Referring to FIG. 1, the controller assembly 100 further includes an operating member 7. The operating member 7 is located outside the housing 1. The operating member 7 penetrates through the housing 1, and is connected to the end of the sliding member 3 away from the worm wheel 23. The user can operate the operating member 7 to perform a desired game action. The sliding member 3 can move back and forth along the first direction "a" towards and away from the operating member 7. The operating member 7 applies the user's operating force to the sliding member 3 to cause the sliding member 3 to move in the worm wheel 23. In other embodiments, multiple operating members 7 are provided on the housing 1, and each operating member 7 corresponds to a desired game action. The user can operate different operating members 7 to perform different game actions. At this time, each operating member 7 has a driving unit 2, a sliding member 3, and a potentiometer 5.

In an embodiment, the housing 1 includes a cover plate 12. The operating member 7 penetrates through the cover plate 12.

In an embodiment, the operating member 7 may be, but not limited to, a key or a joystick that can be operated by the user.

Referring to FIG. 5, the control module 4 includes a control board 41, a memory 42, and a calculating unit 43. The memory 42 is used to store the preset positional value and the preset operating force value. The calculating unit 43 is used to compare the positional information with the preset positional value and compare the operating force information with the preset operating force value, to obtain two comparison results. The control board 41 can communicate with the memory 42, the calculating unit 43, the driving mechanism 21, and the potentiometer 5. The control board 41 controls the driving mechanism 21 to output the driving force according to the two comparison results, and then controls the sliding member 3 to move back and forth along the first direction "a" to adjust the moving position of the sliding member 3.

In an embodiment, the control module 4 communicates with the driving mechanism 21 and the potentiometer 5 wirelessly or in a wired way.

The controller assembly 100 can also be used in other electronic devices such as a mobile phone or a tablet computer. For example, the operating member 7 can function like a touch key of the mobile phone of the tablet computer. The controller assembly 100 can also be used for remote control of unmanned aerial vehicle (UAV) or an aircraft model. For example, the operating member 7 can be a joystick of the UAV or aircraft model.

Compared with the related arts, the controller assembly 100 can adjust the operating force and the moving position of the sliding member 3 in real time through the cooperation of the driving unit 2, the sliding member 3, and the potentiometer 5. In addition, the cooperation of worm wheel 23, worm 22, and sliding member 3 can convert a rotating motion of worm wheel 23 into a linear motion of sliding member 3. The controlling of the operating force and the moving position of the sliding member 3 is accurate and can improve the accurate of the action, so as to improve the game experience of the user. The structure of the controller assembly 100 is simple. The adaptability of the controller assembly 100 is improved. The operating complexity and cost of the controller assembly 100 are reduced.

Figure 6:
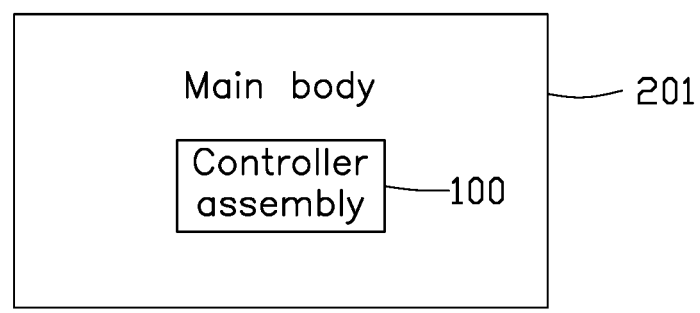
FIG. 6 is a diagrammatic view of an embodiment of an electronic device with the controller assembly of FIG. 1.

FIG. 6 illustrates an embodiment of an electronic device 200. The electronic device 200 includes a main body 201 and the controller assembly 100. The controller assembly 100 is signal connected to the main body 201 and used to control the main body 201. In an embodiment, the electronic device 200 is a game player.

In an embodiment, the controller assembly 100 is connected to the main body 201 wirelessly or in a wired way.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including, the full extent established by the broad general meaning of the terms used in the claims.

What is claimed is:

1. A controller assembly comprising:
a driving unit comprising a driving mechanism, a worm, and a worm wheel, an end of the worm is connected to the driving mechanism, another end of the worm is engaged with the worm;
a sliding member slidably received in the worm wheel;
a potentiometer received in and connected to a side of the worm wheel away from the sliding member; and
a controlling module electrically connected to the potentiometer and the driving mechanism,
wherein the driving mechanism is configured to drive the worm wheel to rotate, causing the sliding member to move back and forth along a first direction, and the first direction is along a central axis of the worm wheel, the potentiometer is configured to detect a rotation information of the worm wheel the controlling module is configured to obtain a positional information of the sliding member according to the rotation information, the controlling module is further configured to obtain an operating force information delivered to the driving mechanism, the controlling module is further configured to compare the positional information with a preset positional value and compare the operating force information with a preset operating force value to obtain two comparison results, the controlling module is further configured to control the driving mechanism to drive the worm wheel to rotate according to the two comparison results, thereby driving the sliding member to move back and forth along the first direction.

2. The controller assembly of claim 1, wherein the worm wheel comprises a worm wheel body and a fixing portion disposed on the worm wheel body, the fixing portion defines a fixing groove, the sliding member is received in the fixing groove and coaxial with the worm wheel.

3. The controller assembly of claim 2, wherein an inner surface of the fixing portion defines a plurality of internal threads, an outer surface of the sliding member defines a plurality of third external threads engaged with the plurality of internal threads, the sliding member is connected to the worm wheel through the plurality of third external threads and the plurality of internal threads.

4. The controller assembly of claim 2, further comprising a limit member, wherein the limit member penetrates through the potentiometer, the worm wheel, and the sliding member along the first direction.

5. The controller assembly of claim 4, further comprising a bottom plate, the bottom plate defines a limit groove, the limit member is fixed in the limit groove.

6. The controller assembly of claim 4, wherein along a second direction perpendicular to the first direction, a cross-sectional shape of the limit member is triangular or polygonal.

7. The controller assembly of claim 1, further comprising an operating member disposed on an end of the sliding member away from the driving unit, wherein the sliding member is configured to move towards and away from the operating member, the operating member is configured to apply the operating force to the sliding member to cause the sliding member to move in the worm wheel.

8. The controller assembly of claim 7, wherein the operating member is a key or a joystick.

9. The controller assembly of claim 1, wherein the control module communicates with the driving mechanism and the potentiometer wirelessly or in a wired way.

10. An electronic device comprising:
a main body; and
a controller assembly signal connected to the host, comprising:
a driving unit comprising a driving mechanism, a worm, and a worm wheel, one end of the worm is connected to an output end of the driving mechanism, another end of the worm is engaged with the worm;
a sliding member slidably received in the worm wheel;
a potentiometer received in and connected to a side of the worm wheel away from the sliding member; and
a controlling module electrically connected to the potentiometer and the driving mechanism,
wherein the driving mechanism is configured to drive the worm wheel to rotate, causing the sliding member to move back and forth along a first direction, and the first direction is along a central axis of the worm wheel, the potentiometer is configured to detect a rotation information of the worm wheel, the controlling module is configured to obtain a positional information of the sliding member according to the rotation information, the controlling module is further configured to obtain an operating force information delivered to the driving mechanism, the controlling module is further configured to compare the positional information with a preset positional value, and compare the operating force information with a preset operating force value to obtain two comparison results, the controlling module is further configured to control the driving mechanism to drive the worm wheel to rotate according to the two comparison results, thereby driving the sliding member to move back and forth along the first direction.

11. The electronic device of claim 10, wherein the worm wheel comprises a worm wheel body and a fixing portion disposed on the worm wheel body, the fixing portion defines a fixing groove, the sliding member is received in the fixing groove and coaxial with the worm wheel.

12. The electronic device of claim 11, wherein an inner surface of the fixing portion defines a plurality of internal threads, an outer surface of the sliding member defines a plurality of third external threads engaged with the plurality of internal threads, the sliding member is connected to the worm wheel through the plurality of third external threads and the plurality of internal threads.

13. The electronic device of claim 12, further comprising a limit member, wherein the limit member penetrates through the potentiometer, the worm wheel, and the sliding member along the first direction.

14. The electronic device of claim 13, further comprising a bottom plate, the bottom plate defines a limit groove, an end of the limit member away from the sliding member is fixed in the limit groove.

15. The electronic device of claim 14, wherein along a second direction perpendicular to the first direction, a cross-sectional shape of the limit member is triangular or polygonal.

16. The electronic device of claim 11, further comprising an operating member disposed on an end of the sliding member away from the driving unit, wherein the sliding member is configured to move towards and away from the operating member, the operating member is configured to apply the operating force to the sliding member to cause the sliding member to move in the worm wheel.

17. The electronic device of claim 16, wherein the operating member is a key or a joystick.

18. The electronic device of claim 11, wherein the control module communicates with the driving mechanism and the potentiometer wirelessly or in a wired way.

19. The electronic device of claim 11, wherein the controller assembly is signal connected to the main body wirelessly or in a wired way.

* * * * *